No. 679,117. Patented July 23, 1901.
H. E. EDDY, C. F. BROWN & J. J. HICKEY.
GAS COOLING APPARATUS.
(Application filed Apr. 27, 1901.)
(No Model.)
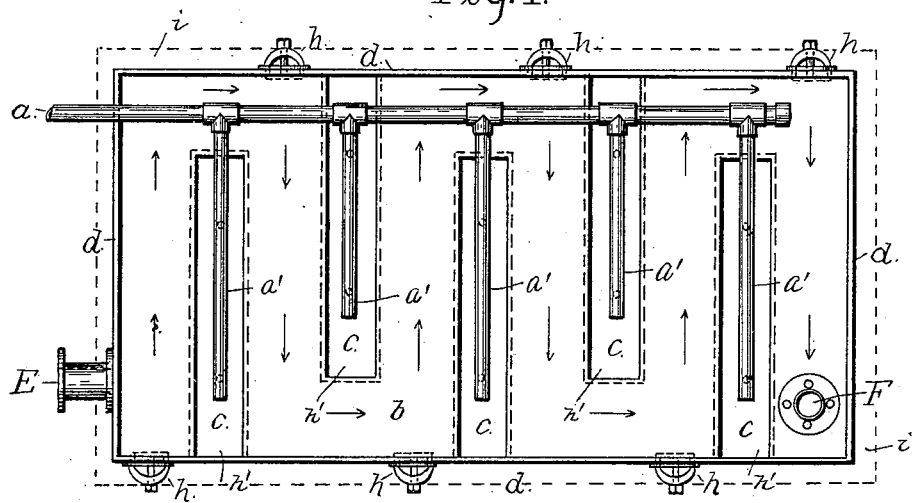
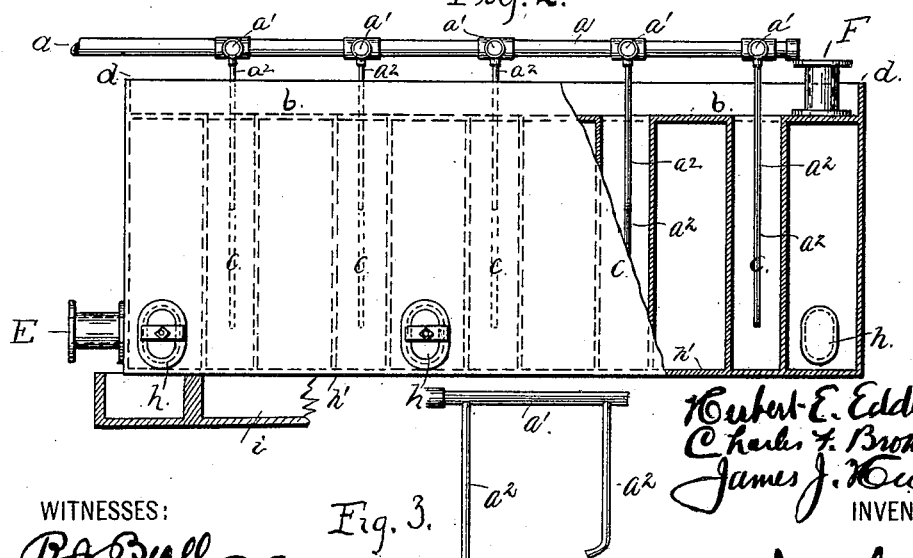

UNITED STATES PATENT OFFICE.

HERBERT E. EDDY, CHARLES F. BROWN, AND JAMES J. HICKEY, OF RUMFORD FALLS, MAINE.

GAS-COOLING APPARATUS.

SPECIFICATION forming part of Letters Patent No. 679,117, dated July 23, 1901.

Application filed April 27, 1901. Serial No. 57,771. (No model.)

*To all whom it may concern:*

Be it known that we, HERBERT E. EDDY, CHARLES F. BROWN, and JAMES J. HICKEY, citizens of the United States, and residents of Rumford Falls, in the county of Oxford and State of Maine, have invented certain new and useful Improvements in Gas-Cooling Apparatus, of which the following is a specification.

The object of this invention is to provide an apparatus or tank for cooling gas of such construction as to present a serpentine passage all the walls of which are cooled by a continuous flow of cold water, whereby the gas as it passes through the apparatus will be cooled by contact with the cold surfaces of said walls.

The invention consists in providing a closed tank containing a series of water-chambers projecting from opposite sides of the tank alternately to form a serpentine passage from one end of said tank to the other, the water-chambers being open at the top of the tank and the latter provided with a raised rim to flood the top, combined with an arrangement of water-pipes having branches which discharge the water into the water-chambers and in such manner as to create a circulation therein to more effectively cool the walls of said chambers.

In the following specification we have entered into a detail description of our improved apparatus for cooling gas, reference being had to the accompanying drawings, and to letters thereon, which designate the different parts, and what we claim in the particular construction of the apparatus is more specifically set forth in the appended claims.

In the drawings forming a part hereof, Figure 1 is a plan view of a gas-cooling apparatus constructed in accordance with our invention. Fig. 2 is a side elevation, one end of the tank being broken away to more clearly show the construction of the water-chambers. Fig. 3 is a detail view of one of the branch pipes.

In carrying out our invention we employ a tank which is preferably rectangular in shape and within said tank construct a series of water-chambers $c$, extending from the opposite sides thereof alternately to form a serpentine passage-way from one end of the tank to the other, as indicated by the arrows in Fig. 1. These water-chambers extend from the bottom $h'$ of the tank to the top $b$ thereof and are open at their upper ends, so that the water may flow out upon the top $b$, the sides and ends of the tank being extended above the top $b$, so that said top may be flooded. At one end of the tank is an inlet-opening having a flanged pipe or coupling E, through which the gas is admitted into one end of the serpentine passage-way, and at the other end of said passage-way is a gas-outlet having a flanged pipe or coupling F, the latter being preferably located in the top $b$. In the sides of the tank are openings by which access may be had to the interior of the tank for the purpose of cleaning the same, the said openings being closed by plates $h$, securely bolted in place.

Located above the tank and extending longitudinally thereof at one side is a water-pipe $a$, to which are connected lateral branch pipes $a'$, disposed directly above the water-chambers $c$, each branch pipe having two smaller discharge-pipes $a^2$, which depend into the water-chambers, with their outlet-openings on different horizontal planes. These water-pipes are for the purpose of supplying cold water to the apparatus, and the ends of the discharge-pipes are preferably turned toward each other, as shown, in order that a circulation will be kept up in the water-chambers to more effectually cool the side walls thereof.

It will be noted that by arranging the water-chambers as shown and described a serpentine passage will be formed extending from one end of the tank to the other and that consequently a very large area of cooling-surface will be presented in a comparatively small tank; also, that by flooding the top of the tank the said top will materially assist in cooling the gas by presenting cold surfaces between the walls of the water-chamber, while the sides of the tank are cooled by the overflow of the water and the bottom kept cool by the waste water, which is caught in the pan $i$.

A gas-cooling tank constructed with water-chambers arranged as herein shown and described will present a serpentine passage having abrupt turns, by which the gas is caused to impinge against the cold walls and will be cooled before passing out of the exit-opening of the apparatus, the cooling operation being made effective by having all the walls of the passage cooled by the constant streams of cold water. The apparatus is simple in construction and arrangement and is compact.

The tank, including the walls of the water-chambers, is preferably made of sheet-lead, while the fittings are all of phosphor-bronze or other metal not affected by the gas.

Having thus described our invention, we claim—

1. An apparatus for cooling gas, comprising a closed tank having water-chambers extending from opposite sides thereof, alternately, forming a serpentine passage-way from one end of the tank to the other, said water-chambers opening through the top of the tank; combined with a water-supply pipe extending above the tank and longitudinally thereof, lateral branch pipes connected to the supply-pipe and disposed above the water-chambers, and smaller discharge-pipes depending from the branch pipes into the water-chambers, a gas-inlet at one end of the serpentine passage-way and a gas-outlet at the other end thereof, substantially as shown and described.

2. An apparatus for cooling gas, comprising a closed tank the top of which is located below the upper ends of the side and end walls, water-chambers located in the tank and extending from the opposite side walls thereof, alternately, forming a serpentine passage-way, said water-chambers opening through the top of the tank; a gas-inlet at one end of the passage-way, and a gas-outlet at the other end thereof; combined with a water-supply pipe, lateral branch pipes, and depending discharge-pipes entering the water-chambers, the ends of said discharge-pipes being in different horizontal planes and turned toward each other, substantially as shown and for the purpose set forth.

HERBERT E. EDDY.
CHARLES F. BROWN.
JAMES J. HICKEY.

Witnesses:
BURT LEON ROUNDS,
G. WILLARD JOHNSON.